(12) United States Patent
Kirichenko

(10) Patent No.: US 7,319,751 B2
(45) Date of Patent: Jan. 15, 2008

(54) DATA ENCRYPTION

(75) Inventor: Alexey Kirichenko, Espoo (FI)

(73) Assignee: F-Secure Oyj, Helsinki (FI)

( * ) Notice: Subject to any disclaimer, the term of this patent is extended or adjusted under 35 U.S.C. 154(b) by 814 days.

(21) Appl. No.: 10/268,971

(22) Filed: Oct. 11, 2002

(65) Prior Publication Data

US 2003/0108196 A1   Jun. 12, 2003

(30) Foreign Application Priority Data

Oct. 12, 2001   (GB) .............................. 0124506.7

(51) Int. Cl.
*H04K 1/00*   (2006.01)

(52) U.S. Cl. .................. 380/37; 380/277; 380/28; 380/42; 377/44

(58) Field of Classification Search .............. 380/37, 380/42, 28–29, 277; 377/28–29, 37, 44
See application file for complete search history.

(56) References Cited

U.S. PATENT DOCUMENTS

| | | | |
|---|---|---|---|
| 5,351,299 A * | 9/1994 | Matsuzaki et al. ............. | 380/37 |
| 5,619,576 A | 4/1997 | Shaw | |
| 5,740,251 A * | 4/1998 | Tajima et al. ................ | 380/269 |
| 5,757,913 A | 5/1998 | Bellare et al. | |
| 6,088,456 A * | 7/2000 | McCracken et al. ......... | 380/259 |
| 6,246,768 B1 * | 6/2001 | Kim ............................. | 380/28 |
| 6,463,150 B1 * | 10/2002 | Moldovyan et al. .......... | 380/28 |
| 6,985,591 B2 * | 1/2006 | Graunke ...................... | 380/277 |

FOREIGN PATENT DOCUMENTS

| | | |
|---|---|---|
| EP | 0 792 041 A2 | 8/1997 |
| EP | 1 063 811 A1 | 12/2000 |
| GB | 2 313 989 A | 12/1997 |
| WO | WO 01/89138 A2 | 11/2001 |

* cited by examiner

*Primary Examiner*—T. B. Truong
(74) *Attorney, Agent, or Firm*—Squire, Sanders & Dempsey L.L.P.

(57) ABSTRACT

A method of encrypting a data unit, the method comprising the steps of dividing the data unit into a series of data blocks, and for each data block, applying a block cipher function to a data block counter value to generate an encrypted block counter value, performing a logical operation to combine the encrypted block counter with the data block, and applying a block cipher function to the combined data.

13 Claims, 2 Drawing Sheets

```
Sub-divide data unit into a series of m, n-bit blocks
```
↓
```
i = 1
```
↓
```
begin encrypting block Mi
```
↓
```
Ci = EK (Mi XOR EK' ((T + i - 1) mod 2n))
```  ←
↓                                                  |
```
Write block Ci to memory
```                                                |
↓                                                  |
```
i = i + 1
```                                                |
↓                                                  |
<Is i > m?> —— No ——————————————————————————————|
↓
Yes
↓
```
End encrypting
```

Figure 1

DATA ENCRYPTION

FIELD OF THE INVENTION

The present invention relates to a method of encrypting data and in particular, though not necessarily, to a method of performing real-time encryption of data.

BACKGROUND TO THE INVENTION

Block ciphers are the most popular algorithms in use today for providing data privacy. Block ciphers with block size n and key size k can be viewed as a family of permutations on the set of all n-bit strings, indexed by k-bit long encryption keys and possessing certain properties. We denote by $E_K(x)$ the image of an n-bit string x under a permutation with index K from a family of permutations defined by block cipher E. We also call this image an encryption of plaintext with block cipher E under key K or, in short, a ciphertext corresponding to plaintext x. Since $E_K$ is a permutation, it has a reverse transformation, which we denote by $D_K$. This reverse transformation can be used for recovering plaintext x given a corresponding ciphertext $y=E_K(x)$, by computing $D_K(y)$.

Some of the properties that are typically required of block ciphers are:

Simplicity of construction. Given key K, we should be able easily to construct $E_K$ and $D_K$ (algorithmic descriptions of the two transformations can be comfortably given in terms of an arbitrary k-bit string K). This is a very important property since complex constructions complicate analysis and may lead to flaws in implementation. We say that a block cipher is a symmetric encryption primitive to stress that knowledge of a single value K is sufficient for deriving both $E_K$ and $D_K$.

Security. It is commonly accepted to consider a block cipher secure if, for a randomly chosen key K, it appears as a random permutation on the set of n-bit strings to any computationally bounded observer (i.e. who does not have an unlimited amount of processing power available) who does not know K and who can only see encryption of a certain number of plaintexts x of their choice. We can also say that a secure block cipher is a good pseudorandom permutation. (Obviously, no block cipher can be secure against a computationally unbounded attacker capable of running an exhaustive search for the unknown value of K.) We refer to [8] for an accurate treatment of the subject.

Good performance. Computing $E_K(x)$ and $D_K(y)$ should be fast for all K, x, y.

Other important practical aspects include reasonable memory requirements and efficiency of software and hardware implementations.

A number of known block ciphers will now be considered.

Data Encryption Standard (DES) has been in wide use since 1977. It is defined as FIPS in [9]. DES supports a 64-bit block size and a 56-bit key size. The design is extremely well studied and has traditionally been considered secure. DES is currently being phased out however because its key size is considered too small to withstand exhaustive search attacks on modem computers.

Triple DES was constructed by combining three DES functions in a specific way to retain good security properties of DES and to increase key size to render exhaustive search attacks infeasible. The algorithm definition can also be found in [9]. Higher security of triple DES comes at the expense of noticeably poorer performance. The cipher supports a 64-bit block size and a 168-bit key size.

Advanced Encryption Standard (AES) has recently been adopted as a new encryption standard [12]. The AES design received several years of thorough reviewing by many leading cryptography researchers. AES supports block sizes of 128, 192, and 256 bits and the same set of key sizes. The cipher allows for very efficient software and hardware implementations, thus addressing the most annoying problem of Triple DES.

In practice, most data units (including any typical file, database record, IP packet, or email message) which require to be encrypted are greater in length than the block size of the chosen cipher. This will require the application of the block cipher function multiple times. There are many ways of doing that and each is referred to as a "mode of operation". The standardised modes of operation employing DES have been published in [10] and [1]. A more general version of the standard, published in [5], generalized four modes of DES to be applicable to a block cipher of any block size. The standard modes are known as Electronic Code Book (ECB), Cipher Block Chaining (CBC), Cipher Feedback (CFB), and Output Feedback (OFB).

According to The National Institute of Standards and Technology (NIST), with the advent of new symmetric key block ciphers such as AES, the currently used modes of operation need to be updated. NIST is accepting proposals for new modes and a second public workshop on the subject was held in August of 2001. The table of proposed modes that NIST has accepted for consideration can be found at http://csrc.nist.gov/encryption/modes/proposedmodes/.

The reason why NIST and others believe that a number of different modes of operation are necessary is that it is probably impossible to derive a single mode of operation that would be the ideal choice for all applications, protocols, and settings. Which mode is the best for a suitable situation depends heavily on the particular set of requirements that need to be satisfied. Below, we list some of the properties that one always or usually requires from a mode of operation:

(a) Security. This is always the most important property but its exact meaning may vary depending on what it is possible to achieve in a particular setting. We usually assume that our underlying block cipher is secure and that the key size k is chosen so that an exhaustive key search is computationally infeasible. However, regardless of the cryptographic strength of the block cipher, ciphertext produced by using some modes of operation may leak information about the corresponding plaintext as we encrypt many plaintext blocks under the same key, or encrypt plaintexts having identical parts under the same key. The strongest notion of security that one can hope to achieve in practice is so-called semantic security: any non-trivial computational information that can be derived from encryption of a message $E_K(M)$, should also be computable without $E_K(M)$. In certain situations, it is impossible to achieve semantic security, and then the goal is to leak the minimum possible amount of information.

We note that the best argument in favor of the security of a particular mode is a tight reduction from the security of the mode to the security of the underlying cipher. For that, we need to show that a successful attack on the mode of operation gives us almost an equally successful attack on the underlying cipher. Thus, our belief in the security of, e.g. AES, can be translated into trust of a mode of operation of AES whose security is tightly reduced to the security of its underlying cipher. This approach was originally introduced and developed in [2].

In many cases, it is desirable that the mode of our choice provides not only privacy or confidentiality of messages, but also authenticity. This property guarantees that the only feasible way to produce a valid ciphertext is to apply the encryption function $E_K$ to some message M, which requires knowledge of key K. Unfortunately, it is sometimes difficult to efficiently achieve authenticity in practice, for example, due to the specific ways used to access information.

(b) Efficiency. It is obvious that to encrypt an l-bit long message, we need to apply the underlying block cipher function at least [l/n] times, where n is the block size of our cipher. Any additional operations that a particular mode of operation involves are considered as an overhead that we want to minimize.

(c) Random access. Some modes allow encrypting and decrypting of any given block of the data in an arbitrary message without processing any other portions of the message.

(c) Parallelizability. Can we use the advantage of a multiprocessor machine and run the encryption and decryption computations in parallel?

(d) Keying material. Some modes require two independent block cipher keys, which leads to additional key generation operations, a need for extra storage space or extra bits in communication.

(e) Counter/IV/Nonce requirements. Almost all modes make use of certain additional values together with block cipher key(s). In certain cases, such values must be generated at random or may not be reused with the same block cipher key to achieve the required security goals. Limitations of this sort may rule out some modes for certain applications.

(f) Pre-processing capability. Can some part of computations be done prior to knowing the message that needs to be processed? In certain settings, this may save us valuable time, whilst in other cases this may be practically irrelevant.

There will now be described several popular modes of operation and the properties they possess.

ECB mode (also called the native mode). To encrypt a message of arbitrary length, we split it into consecutive n-bit blocks $M_1$, $M_2$, $M_3$, . . . and apply $E_K$ separately to each block. The resulting encrypted message will be $E_K(M_1)$, $E_K(M_2)$, $E_K(M_3)$, . . . In general, the i-th ciphertext block $C_i$ is computed as $C_i=E_K(M_i)$. The decryption formula is straightforward: $M_i=D_K(C_i)$.

(a) Encryption in ECB mode maps identical blocks in plaintext to identical blocks in ciphertext, which obviously leaks some information about plaintext. Even worse, if a message contains significant redundancy and is sufficiently long, the attacker may get a chance to run statistical analysis on the ciphertext and recover some portions of the plaintext. So, in some cases, security provided by ECB is unacceptably weak.

(b) It is evident that ECB achieves perfect efficiency as it does not involve any computational overhead.

(c) Since all blocks are processed individually, ECB provides random access to data. That is to say that, working with a particular block, we do not have to process any other blocks.

(d) ECB is perfectly parallelizable.

(e) Requires a single block cipher key.

(f) Does not use any additional values.

(g) No pre-processing is possible. However, this is not a concern due to the processing properties (b) and (d).

Note also that plaintext can be easily manipulated by removing, repeating, or interchanging ECB-encrypted blocks.

To conclude, ECB may be a good choice if all we need to do is protect very short pieces of data or nearly random data. A typical use case for ECB is the protection of randomly generated keys and other security parameters.

CBC mode. In this mode the exclusive-or (XOR) operation is applied to each plaintext block and the previous ciphertext block, and the result is then encrypted. An n-bit initialization vector IV is used to encrypt the very first block. To encrypt our message we successively compute $$C_1=E_K(M_1 \text{ XOR } IV)$$

$$C_2=E_K(M_2 \text{ XOR } C_1)$$

Letting $C_0$=IV, we have $C_i=E_K(M_i \text{ XOR } C_{i-1})$ as a general formula. Decryption is given by $M_i=D_K(C_i) \text{ XOR } C_{i-1}$.

It can be seen that encryption of the i-th block depends on all previous plaintext blocks.

(a) CBC hides patterns in plaintext. In fact, it can be proved that there is a reduction of security of CBC mode to security of the underlying cipher provided that IV is chosen at random [2]. Still, some theoretical problems exist for CBC. For example, if one observes in a ciphertext that $C_i=C_j$, it immediately follows that $M_i \text{ XOR } M_j=C_{i-1} \text{ XOR } C_{j-1}$, where the right-hand side of the equation is known. This is called the birthday or matching ciphertext attack. Of course, if the underlying cipher is good in the sense of pseudorandom permutation and its block size is sufficiently large, the probability of encountering two identical blocks in ciphertext is very low. By itself, CBC does not provide authenticity.

(b) The computational overhead of CBC is just a single XOR operation per block encryption/decryption, so its efficiency is very good.

c) CBC provides random read access to encrypted data, that is, to decrypt the i-th lock, we do not need to process any other blocks. However, any change to $M_i$ would require re-encryption of all blocks with indexes greater than i. We say that CBC does not support random write access to encrypted data.

(d) CBC cannot be parallelized. (In fact, there is a method called interleaving which allows for encrypting of t blocks in parallel at the expense of generation/maintaining t initialization vectors.)

(e) Requires a single block cipher key.

(f) Uses an initialization vector that must be generated at random. (It is actually sufficient to require that we never reuse a value of S for a particular key K and use IV=$E_K$(S).)

(g) No pre-processing is possible.

It can be seen that CBC is quite a good choice unless we need random write access, authenticity, or convenient parallelizability. Complemented with appropriate authentication methods, CBC is successfully used in numerous applications for encrypting email messages, IP packets, etc.

Counter mode. This mode has been proposed to NIST for consideration [7]. Although it is not a standard mode of operation, it has found use in certain applications and protocols. In this mode, a block cipher is used to generate a bit stream that is then XORed with plaintext in the following way:

$$C_1=M_1 \text{ XOR } E_K(T)$$

$$C_2=M_2 \text{ XOR } E_K(T+1 \text{ mod } 2^n)$$

where T is an n-bit string used as an initial value of counter, and the mod$2^n$ operation is used to ensure that the argument to the encryption function is always an n-bit value. So, the formula is:

$$C_i = M_i \text{ XOR } E_K((T+i-1) \bmod 2^n)$$

The decryption formula is identical:

$$M_i = C_i \text{ XOR } E_K((T+i-1) \bmod 2^n).$$

We see that encryption of a block depends on its offset in the message and does not depend on the values of any other blocks. We also note that encryption and decryption operations are identical which allows savings on the implementation code size and required memory.

(a) The security of Counter mode can be reduced to the security of the underlying cipher provided that values of counter $(T+i-1)$ are never reused with the same key K [2]. (See also point (f) below)

By itself, the mode does not provide authenticity.

(b) The Computational overhead of Counter mode is also a single XOR operation per block encryption/decryption as in CBC, plus updating the value of T, so its efficiency is very good.

(c) Counter mode provides random read and write access to encrypted data.

(d) It is perfectly parallelizable.

(e) Requires a single block cipher key.

(f) Uses an initial counter value that may not be reused with the same key K. Moreover, if we encrypt two messages under the same key, none of the values of counter used for one of them may be equal to any counter value used in encryption of the other message. (If the same value of counter is used for encrypting two distinct blocks $M_i$ and $M'_j$ under the same key, the attacker immediately obtains the value of $M_i$ XOR $M'_j$, which is unacceptable under any reasonable definition of security.) There are no other requirements for the initial counter value generation method. In particular, initial values do not have to be generated at random.

(g) Counter mode is ideal in the sense of pre-processing. The bit stream used in the mode can be computed at any time as this does not require a knowledge of the message to be encrypted or decrypted.

In many respects, Counter mode is superior to CBC mode. However, this mode cannot be used in applications where it is impossible to provide non-intersecting sets of counter values for distinct messages encrypted under the same key.

We complete this section by defining OFB and CFB modes which are the two remaining standard modes. These modes resemble Counter mode in the sense that they also convert block ciphers into key stream generators.

OFB mode. Pick up IV at random and let $Z_0 = \text{IV}$. The key stream is given by the recurrence $Z_i = E_K(Z_{i-1})$. Then, as in Counter mode, $C_i = M_i$ XOR $Z_i$ and $M_i = C_i$ XOR $Z_i$.

CFB mode. Pick up TV at random and let $C_0 = \text{IV}$. The key stream is given by the relation $Z_i = E_K(C_{i-1})$. To encrypt and decrypt, we again use $C_i = M_i$ XOR $Z_i$ and $M_i = C_i$ XOR $Z_i$ respectively.

STATEMENT OF THE INVENTION

In the light of the above discussion, it will now be appreciated that in order to select an appropriate mode of operation for a particular application, one needs to clearly understand the requirements that must be satisfied for that application. There will now be presented some background on software implementations of real-time file and disk encryption.

Real-time encryption makes it possible to achieve a very important goal in protecting information stored in computers and other electronic devices like Personal Digital Assistants (PDAs). Namely, confidential information is always stored in encrypted form and at any particular time only those portions that are required by applications (running on behalf of the user) are kept in plaintext in RAM of the computing system. This approach avoids the drawbacks of having entire data units (e.g. files) decrypted, i.e. extra disk space required for the storage of files that are being processed, long delays when opening large files, security risks arising from the use of temporary files, etc.

Let us now consider what the real-time encryption concept means in practice in order to set the requirements on the mode of operation which we want to use to protect data.

We will describe how real-time encryption products handle data, in our example the content of a file, which the user wants to keep confidential.

1. Initial encryption. We generate a new block cipher key and other necessary encryption parameters, then the entire content of the file is encrypted in a single pass.

2. Reading from the file. It is impossible to predict which parts of the file will be accessed by the applications being run by the user, and in which order the parts will be accessed. Thus, our task is to intercept all read requests for the file data, decrypt the requested portions, and place the plaintext data into buffers supplied by the requesting applications. To make this activity invisible to the user, we should restrict ourselves to processing only data blocks containing requested information and guarantee uniform access time to any data block in the file.

3. Writing to the file. This is almost a mirror image of reading. We need to intercept every write request, take plaintext data supplied by the requesting application, encrypt the data, and write the ciphertext to the requested location in the file. (Note that to do this we may need to first read and decrypt some additional data from the file.) Again, our goal is not to touch any "unnecessary" blocks. In particular, this means that we cannot afford to change the block cipher key or any other encryption parameters every time the file content gets modified since this would require re-encryption of the entire file content. Also, one cannot rely on any strategy of "regular" refreshing the encryption parameters, as coming up with any universally acceptable trade-off between security and performance appears infeasible in this context.

We can now determine which properties of the mode of operation of the underlying block cipher are required or desired for real-time encryption products. As a trivial opening observation, we note that usually no assumption whatever can be made on possible sizes, contents, etc. of data units that we will need to protect.

(a) Because the block cipher key and other encryption parameters do not change during the entire life span of a protected data unit, we cannot hope to hide facts and places of modifications made to the unit content. Our goal is not to leak any other information.

As for providing authenticity, any practical method of authenticity verification would require the processing of data unit content in its entirety. In general, this may lead to a potentially severe performance penalty. (Note that the efficient updating of authentication tags "on-the-fly" is possible by employing Incremental Message Authentication Codes techniques.)

(b) We would like to minimize the overhead of block encryption and decryption operations. However, the overhead of other file I/O and book-keeping operations involved in processing of blocks by real-time encryption products is usually quite significant. So a reasonable computational overhead induced by mode of operation does not noticeably affect the overall performance. Of course, we have to rule out modes that considerably influence the overall performance because a good real-time encryption product must be fast enough to hide the encryption overhead from the user.

(c) We need to have random read and write access to encrypted data.

(d) Parallelizability is probably not vital but definitely useful.

(e) Keying information associated with any protected data unit must be stored somewhere. Since we naturally want to minimize necessary storage space, our preference is those modes that do not require the storing of more than a single block cipher key.

(f) We prefer modes with a smaller total size of additional encryption parameters. What is more important, mode security may not be compromised by using the same combination of block cipher key and encryption parameters for protecting distinct versions of the same data unit. (Note that two such versions may differ in every single byte.)

(g) Since we aim at providing uniform access time for all parts of protected data units, we usually cannot afford time consuming pre-processing which involves keys and other encryption parameters. On the other hand, computationally inexpensive pre-processing that noticeably reduces the time of subsequent operations would be useful.

In contrast to optional pre-processing, there are modes of operation that require certain pre-computations to be performed prior to any block encryption or decryption operations. Depending on the amount of time such pre-computations take, this may be a major drawback in the real-time encryption setting.

It will be appreciated that none of the four standard modes of operation meets the requirements imposed by real-time encryption applications. ECB does not provide adequate security, CBC and CFB do not give us random write access, and with OFB we would miss random read access. Last but not least, an attempt to reuse encryption parameters for CBC, CFB, and OFB would surely breach security. Unfortunately, more recently proposed modes of operation do not seem to take the needs of real-time encryption products into serious consideration either. Although some of them are sophisticated, efficient, and come with proofs of security, they were not designed to address the specific problems discussed above in respect of applications which need real-time, random access.

According to a first aspect of the present invention there is provided a method of encrypting a data unit, the method comprising the steps of:
dividing the data unit into a series of data blocks; and
for each data block, applying a block cipher function to a data block counter value to generate an encrypted block counter value, performing a logical operation to combine the encrypted block counter with the data block, and applying a block cipher function to the combined data.

It will be appreciated that the data unit to which this encryption method may be applied can be a file (e.g. a word processor or spreadsheet document), an e-mail, a database record or any other data processing or storage format. The data unit may also be a unit for transmission over some communication network, e.g. an IP packet.

The block cipher function which is applied to the combined data is preferably the same block cipher function which is applied to the data block counter. Preferably, both cipher functions use a different encryption key. The encryption key used by the cipher function when applied to the data block counter value may be derived from the key used by the cipher function when applied to the combined data.

The logical operation used to combine the encrypted block counter with the data block should be invertible, and more preferably easily invertible. Preferably, said logical operation is an exclusive-OR operation.

Preferably, said counter is initialised to some non-repeating known value, e.g. chosen at random. The counter is incremented for each data block of the series of blocks.

Preferably, a logical operation is carried out on the counter prior to its encryption with a cipher function to prevent the counter from exceeding the block length. More preferably, this operation is a $mod2^n$ operation, where n is the block length.

It will be appreciated that a block of a data unit, encrypted using the method of the above first aspect of the present invention, may be decrypted by applying the cipher function to the block counter value for the block, applying an inverse cipher function to the encrypted block, and combining the two results with a logical operation.

It will be apparent that, compared with the Counter mode, the present invention requires an extra invocation of the block cipher encryption or decryption function. Whilst this results in a decrease in the speed of encryption/decryption operations, experiments on a number of known platforms show that the overall product performance drops down by at most 10%-15% which goes practically unnoticed by users.

To process an arbitrary block of the data unit, there is no need to process any other blocks. Thus, we achieve random read and write access to protected data. As each block is processed independently, this mode is highly parallelizable. It has a critical path of only two block cipher invocations.

To protect any data unit, we need to generate and store only a single block cipher key. This property may be of importance for existing products in the case of migration from some other single-key mode like ECB or CBC.

The only additional encryption parameter is the initial value of the counter, as in the Counter mode. The new mode does not however leak any non-trivial information about plaintext as a result of encrypting distinct messages under the same key and initial (counter) value.

Pre-processing is possible with the method described. The mode does not require any pre-computations except, possibly, for the step of deriving an encryption key K' (used by the cipher function when applied to the data block counter value) from the key K (used by the cipher function when applied to the combined data), and initializing one additional block cipher function that should be a small overhead for any well-designed block cipher. Of course, if future analysis shows that use of K'=K is secure, we could avoid any obligatory pre-computations altogether.

To encrypt l-bit long M, such that l mod n≉0, we need to append to it (n−l mod n) padding bits. Generating such padding bits at random is always the most secure choice. However, if generating random bits is too costly in a particular environment, plaintext may be padded with 1-bits as this does appear to weaken the encryption security.

According to a second aspect of the present invention there is provided a computer storage medium having stored thereon a program for causing a computer to encrypt a data unit by:
dividing the data unit into a series of data blocks; and
for each data block, applying a block cipher function to a data block counter value to generate an encrypted block counter value, performing a logical operation to combine the encrypted block counter with the data block, and applying a block cipher function to the combined data.

The program may also be arranged to cause the computer to decrypt an encrypted block by applying the cipher function to the block counter value for the block, applying an inverse cipher function to the encrypted block, and combining the two results with a logical operation.

According to a third aspect of the present invention there is provided a computer device comprising:

a memory for storing data:

first processing means for dividing a data unit into a series of data blocks and, for each data block, applying a block cipher function to a data block counter value to generate an encrypted block counter value, performing a logical operation to combine the encrypted block counter with the data block, applying a block cipher function to the combined data, and storing the encrypted data block in said memory; and second processing means for decrypting an encrypted block stored in the memory by reading the encrypted block from the memory, applying the cipher function to the block counter value for the block, applying an inverse cipher function to the encrypted block, and combining the two results with a logical operation.

Preferably, the first processing means is arranged to reencrypt an individually decrypted block following modification of the block.

BRIEF DESCRIPTION OF THE DRAWINGS

FIG. 1 is a flow diagram of a method for performing the initial encryption of a data unit;

DETAILED DESCRIPTION OF A PREFERRED EMBODIMENT

For the purpose of the following discussion, it is assumed that we want to encrypt a series of data blocks $M_i$ (where i is the block index) in real-time and in such a way that each of the encrypted data blocks may be accessed, decrypted in real-time, and modified independently of the other data blocks. By real-time, we mean that the encryption (and decryption operation) is carried out as part of a read or write operation on a computing device in such a way that the user does not perceive any prolonged processing delay over and above that which would result if the data were not to be encrypted or decrypted. Each block has a length of n-bits.

Encryption is carried out using a cipher function $E_K$ where K is a randomly generated k-bit encryption key. The cipher function may be any suitable function although the AES function is preferred. As well as the key K, a second key K' is required. K' may be derived deterministically from the key K using one of the following mechanisms:

$K'=(K+1) \mod 2^k$;

$K'=K \ XOR \ 11 \ldots 1$ (the second operand is a k-bit string of 1's);

$K'=E_K(S)$, where S is an arbitrary fixed n-bit string;

$K'=E_K(T)$

It is believed that choosing any of the above options makes the mechanism described below extremely secure in the case of real-time encryption. It is also possible that letting K'=K will also result in a secure mode of operation. This is desirable as it would save on pre-computation time and memory space (required for initialising and storing the extra block cipher function).

Each block $M_i$ of the data unit is encrypted using the following formula:

$$C_i = E_K(M_i \ XOR \ E_{K'}((T+i-1) \bmod 2^n))$$

where $C_i$ is the encrypted result, and T is an n-bit string being the initial value of the block counter (T+i+1). In order to decrypt an encrypted block $C_i$, the inverse function $D_K$ is used:

$$M_i = D_K(C_i) XOR \ E_{K'}((T+i-1) \bmod 2^n).$$

It will be appreciated that a read instruction from an operating system will typically identify the memory location where the block is stored. As the block size and the start location of the data unit are known, it is trivial to calculate the value of i required for decryption.

Figure 2:
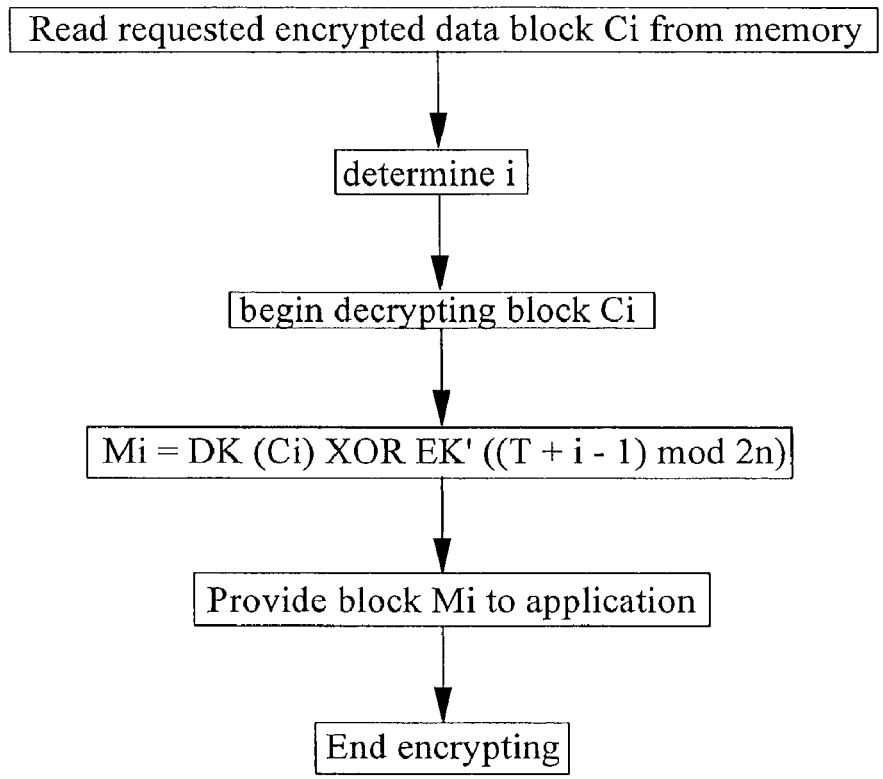
FIG. 2 is a flow diagram of a method for decrypting a data unit in real-time.
Figure 3:
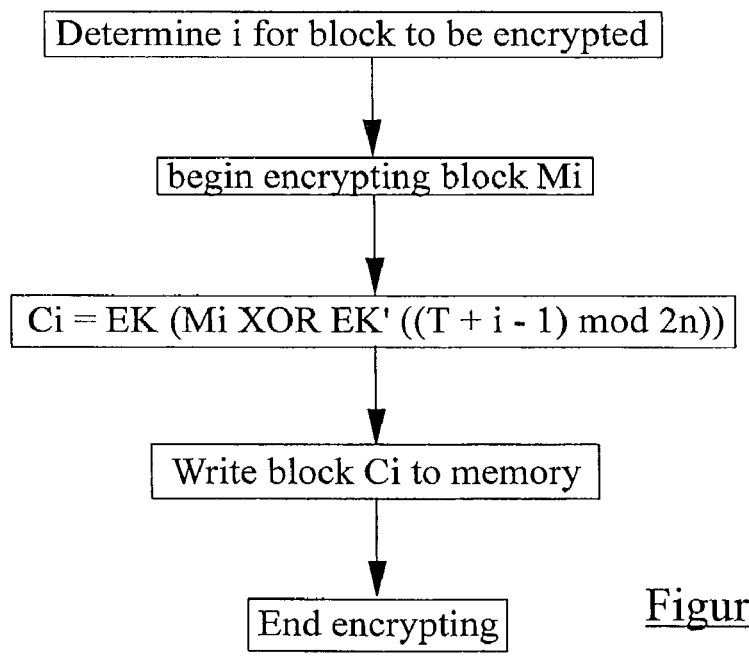
FIG. 3 is a flow diagram of a method for encrypting a data block of a data unit in real-time.

FIG. 1 is a flow diagram illustrating the method of encrypting a data unit (e.g. the initial encryption phase), whilst that of FIG. 2 illustrates the method of decryption. FIG. 3 illustrates the real-time encryption of a single block such as might occur after a data unit has been initially encrypted, and a single block of that unit decrypted and modified.

The encryption and decryption methods described here may be implemented on any suitable computing system. However, the methods are ideally suited for use with mobile computing platforms such as laptop and palmtop computers, PDAs, mobile phones, and communicator type devices, where there is a need to constantly secure stored data due to the risk of the device being lost or stolen.

It will be appreciated by the person of skill in the art that various modifications may be made to the above described embodiments without departing from the scope of the present invention.

REFERENCES

1. ANSI X3.106, "American National Standard for Information Systems—Data Encryption Algorithm—Modes of Operation", American National Standards Institute, 1983.
2. M. Bellare, A. Desai, E. Jokipii, and P. Rogaway. "A concrete security treatment of symmetric encryption: Analysis of the DES modes of operation." *Proceedings of 38th Annual Symposium on Foundations of Computer Science* (FOCS 97), IEEE, 1997. www.cs.ucdavis.edu/~rogaway
3. M. Blaze. "A Cryptographic File System for Unix." *Proceedings of the First ACM Conference on Computer and Communications Security*, Fairfax, Va., November 1993. www.crypto.com/papers/
4. ISO 8372, "Information processing—Modes of operation for a 64-bit block cipher algorithm", International Organization for Standardization, Geneva, Switzerland, 1987
5. ISO/IEC 10116 "Modes of operation for an n-bit block cipher algorithm", International Organization for Standardization, Geneva, Switzerland
6. C. Jutla. "Parallelizable Encryption Mode with Almost Free Message Integrity." Contribution to NIST. Updated manuscript, posted May 24, 2001 at csrc.nist.gov/encryption/modes/proposedmodes 7. H. Lipmaa, P. Rogaway, D. Wagner. "Counter Mode Encryption." Contribution to NIST. csrc.nist.gov/encryption/modes/proposedmodes
8. M. Luby, "Pseudorandomness and Cryptographic Applications", Princeton Computer Science Notes, Princeton Univ. Press, 1996
9. National Bureau of Standards, Data Encryption Standard, U.S. Department of Commerce, FIPS PUB 46-3, 1999
10. National Bureau of Standards, NBS FIPS PUB 81, "DES modes of operation", U.S. Department of Commerce, 1980.
11. P. Rogaway, M. Bellare, J. Black, T. Krovetz. "OCB: A Block-Cipher Mode of Operation for Efficient Authenticated Encryption." Contribution to NIST. Revised paper posted on Aug. 14, 2001 at csrc.nist.gov/encryption/modes/proposedmodes
12. US National Institute of Standards. Specification for the Advanced Encryption Standard (AES). Draft Federal Information Processing Standards, Feb. 28, 2001. Based on: J. Daemen and V. Rijmen, "AES Proposal: Rijndael." Sep. 3, 1999. www.nist.gov/aes

The invention claimed is:

1. A method of encrypting a data unit, the method comprising the steps of:
   dividing the data unit into a series of data blocks;
   assigning a data block counter value to each data block; and
   for each data block, applying a block cipher function to the assigned data block counter value to generate an encrypted block counter value, performing a logical operation to combine the encrypted block counter with the data block, and applying a block cipher function to the combined data.

2. A method according to claim 1, wherein the block cipher function which is applied to the combined data is the same block cipher function which is applied to the data block counter.

3. A method according to claim 1, wherein both cipher functions use the same encryption key.

4. A method according to claim 1, wherein both cipher functions use different encryption keys.

5. A method according to claim 4, wherein the encryption key used by the cipher function when applied to the data block counter value is derived from the key used by the cipher function when applied to the combined data.

6. A method according to claim 1, wherein said logical operation is an exclusive-OR operation.

7. A method according to claim 1, wherein said counter is initialised to some known value and is incremented for each data block of the series of blocks.

8. A method according to claim 1, wherein a logical operation is carried out on the counter value prior to its encryption with a cipher function to prevent the counter value from exceeding the block length.

9. A method of decrypting a data block of a data unit encrypted with the method of claim 1, the method comprising applying the cipher function to the block counter value for the block, applying an inverse cipher function to the encrypted block, and combining the two results with a logical operation.

10. A computer storage medium having stored thereon a program for causing a computer to encrypt a data unit by:
    dividing the data unit into a series of data blocks;
    assigning a data block counter value to each data block; and
    for each data block, applying a block cipher function to the assigned data block counter value to generate an encrypted block counter value, performing a logical operation to combine the encrypted block counter with the data block, and applying a block cipher function to the combined data.

11. A storage medium according to claim 10, the program being arranged to cause the computer to decrypt an encrypted block by applying the cipher function to the block counter value for the block, applying an inverse cipher function to the encrypted block, and combining the two results with a logical operation.

12. A computer device comprising:
    a memory for storing data:
    first processing means for dividing a data unit into a series of data blocks and assigning a data block counter value to each data block, and, for each data block, applying a block cipher function to the assigned data block counter value to generate an encrypted block counter value, performing a logical operation to combine the encrypted block counter with the data block, applying a block cipher function to the combined data, and storing the encrypted data block in said memory; and
    second processing means for decrypting an encrypted block stored in the memory by reading the encrypted block from the memory, applying the cipher function to the block counter value for the block, applying an inverse cipher function to the encrypted block, and combining the two results with a logical operation.

13. A device according to claim 12, wherein the first processing means is arranged to reencrypt an individually decrypted block following modification of the block.

* * * * *